United States Patent
Majdabadi et al.

(10) Patent No.: US 11,750,736 B1
(45) Date of Patent: Sep. 5, 2023

(54) DETECTING AND PREVENTING EXPLOITATIVE CALLS

(71) Applicant: International Business Machines Corporation, Armonk, NY (US)

(72) Inventors: Hamid Majdabadi, Ottawa (CA); Su Liu, Austin, TX (US); Ravithej Chikkala, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/650,891

(22) Filed: Feb. 14, 2022

(51) Int. Cl.
*H04M 3/22* (2006.01)

(52) U.S. Cl.
CPC ..................................... *H04M 3/22* (2013.01)

(58) Field of Classification Search
None
See application file for complete search history.

(56) References Cited

U.S. PATENT DOCUMENTS

| | | | |
|---|---|---|---|
| 4,883,063 A | 11/1989 | Bernard | |
| 7,684,556 B1* | 3/2010 | Jaiswal | H04M 3/5166 379/266.01 |
| 9,779,407 B2 | 10/2017 | Adjaoute | |
| 10,410,220 B2 | 9/2019 | Miltonberger | |
| 10,769,636 B2 | 9/2020 | Byrne | |
| 2009/0327006 A1 | 12/2009 | Hansan | |
| 2010/0228656 A1* | 9/2010 | Wasserblat | G06Q 40/03 705/35 |
| 2013/0163737 A1 | 6/2013 | Dement | |
| 2013/0184517 A1* | 7/2013 | Collier | A61B 5/02405 600/28 |
| 2013/0336465 A1* | 12/2013 | Dheap | H04M 3/5166 379/88.01 |
| 2015/0288791 A1 | 10/2015 | Weiss | |
| 2017/0071551 A1 | 3/2017 | Jain | |
| 2022/0114219 A1* | 4/2022 | Akinwande | G06F 16/90332 |

OTHER PUBLICATIONS

"Journey to AI Blog—The IBM Data and AI blog", IBM, Printed Dec. 28, 2021, 5 pages, <https://www.ibm.com/blogs/journey-to-ai/>.
Chandola et al., "Anomaly detection: A survey", ACM Computing Surveys (CSUR) 41.3, Aug. 15, 2007, 74 Pages.

(Continued)

*Primary Examiner* — Quynh H Nguyen
(74) *Attorney, Agent, or Firm* — Peter Suchecki (57) ABSTRACT

Computer-implemented methods, computer program products, and computer systems for detecting and preventing exploitative calls. The computer-implemented methods include one or more processors configured for receiving voice call data corresponding to an active voice call with a user device, wherein the voice call data comprises caller voice data and user voice data; determining that the caller voice data includes a solicitation of information from a user associated with the user device; retrieving user profile data comprising user health data associated with the user; determining user call stress levels based on the voice call data and the user profile data; and responsive to determining that the user call stress levels exceed a predetermined threshold and that the solicitation of information includes a material information request, generating an alert.

15 Claims, 5 Drawing Sheets

(56) References Cited

OTHER PUBLICATIONS

Cox, Lindsay Kolowich, "14 Stress Management Apps to Relax Your Mind & Body", HubSpot, Inc., Feb. 1, 2017, 20 Pages, <https://blog.hubspot.com/marketing/stress-management-apps>.

Eldardiry et al., "Multi-source fusion for anomaly detection: using across-domain and across-time peer-group consistency checks". Journal of Wireless Mobile Networks, Ubiquitous Computing, and Dependable Applications, vol. 5, No. 2, Jan. 2013, 20 Pages.

Hsu et al., "Examining Predictors and Mediators of Vulnerability to Telecommunications Fraud among Senior Citizens in Taiwan", 14th Asia-Pacific Regional Conference of the International Telecommunications Society (ITS): Mapping ICT into Transformation for the Next Information Society, Kyoto, Japan, Jun. 24-27, 2017, 24 Pages.

Kim et al., "Insider Threat Detection Based on User Behavior Modeling and Anomaly Detection Algorithms", Applied Sciences 9, No. 19, 4018, Special Issue Machine Learning for Cybersecurity Threats, Challenges, and Opportunities, Sep. 25, 2019, 21 Pages.

\* cited by examiner

DETECTING AND PREVENTING EXPLOITATIVE CALLS

BACKGROUND

The present invention relates generally to the field of data processing, and more particularly to detecting and preventing exploitative calls.

Communications fraud or financial exploitative telemarketing is defined as the use of telecommunication technologies with bad intentions such as illegally acquiring money or other information from a person, especially those who are more vulnerable to such intentions. For example, some adults are increasingly targeted to financial exploitation schemes via voice calls for various different reasons related to certain vulnerabilities. Financial exploitation continues to be a pervasive crime affecting vulnerable consumers.

SUMMARY

Aspects of the present invention disclose computer-implemented methods, computer program products, and computer systems for detecting and preventing exploitative calls. The computer-implemented method may include one or more processors configured for receiving voice call data corresponding to an active voice call with a user device, wherein the voice call data comprises caller voice data and user voice data. Further, the one or more processors may be configured for determining that the caller voice data includes a solicitation of information from a user associated with the user device. Furthermore, the one or more processors may be configured for retrieving user profile data comprising user health data associated with the user and determining user call stress levels based on the voice call data and the user profile data. Even further, responsive to determining that the user call stress levels exceed a predetermined threshold and that the solicitation of information contains a material information request, the computer-implemented method may include one or more processors configured for generating an alert.

DETAILED DESCRIPTION

Embodiments of the present invention describe computer-implemented methods, systems, and computer program products for detecting and preventing exploitative calls.

Aspects of the present invention recognize that additional security measures in place between unidentified callers and customers of insurance companies, financial institutions, and other types of companies or businesses would significantly decrease the likelihood of customers falling victim to exploitative acts committed against them. There are various types of fraud intended to gain financial or personal information, the most common of which occurs over a voice call. Embodiments described herein are configured to augment and improve upon exploitation prevention measures and emerging technologies to further protect the vulnerable sector of the society from financial exploitation and abuse. Enhanced protection may be achieved by detecting an anomaly in a voice communication, cross-reference the detected anomaly with user health data (e.g., baseline and real-time), determine if an exploitation attempt is ongoing, and if so, alert the customer engaged on the voice call and/or a third-party (e.g., financial institution, designated family member, law enforcement authority) to take some action to prevent the customer from making a decision under duress cause by stress or pressure.

Aspects of the present invention provide computer-implemented methods to receive voice call data corresponding to an active voice call, determine that the user is under duress to share financial or personal information during the call and informing the user not to share the information based on determining the user is under stress of making a decision. The user stress level of the call may be determined based on user health data and determining that the call is soliciting financial information or attempting to sell products or services to the user. If the call is determined to exceed a user stress threshold, embodiments of the present invention may be configured to alert the user and/or a third-party about the exploitative nature of the call and request preventative measures or actions to take place to prevent the user from sharing confidential information under duress.

For example, embodiments of the present invention may be configured to receive user data corresponding a user, wherein the user data may include user profile data (e.g., demographics, identifying information, account information), user health data (e.g., biometric data, medical data), user environment data (e.g., temperature data, day and time data, location data), and user device data (e.g., mobile device data, Internet-of-Things (IoT) device data, sensor data), or any other data associated with the user. Further, embodiments of the present invention may be configured to extract key data characteristics (e.g., keywords, ask, pressure, stress, health swing) of the user along with characteristics and/or parameters of connected monitoring devices (e.g., personal assistance, health monitoring devices, unscheduled activity/action, microphone).

Internet of Things (IoT) refers to the concept of extending internet connectivity beyond conventional computing platforms such as personal computers and mobile devices, and into any range of traditionally non-internet-enabled physical devices and everyday objects. Embedded with electronics, internet connectivity, and other forms of hardware (such as sensors), these devices and objects can communicate and interact with others over the Internet, and the devices and objects can be remotely monitored and controlled.

The definition of IoT has evolved due to convergence of multiple technologies, real-time analytics, machine learning, commodity sensors, and embedded systems. Traditional fields of embedded systems, wireless sensor networks, control systems, automation (including home and building automation), and others all contribute to enabling the IoT. In the consumer market, IoT technology is most synonymous with products pertaining to the concept of the "smart home," covering devices and appliances (such as lighting fixtures, thermostats, home security systems and cameras, and other home appliances) that support one or more common ecosystems, and can be controlled via devices associated with that ecosystem, such as smartphones and smart speakers.

In a smart home environment, IoT devices may be programmed to automatically perform activities (e.g., detect user activity, monitor user health metrics, transmit collected data to a network) within the home.

Aspects of the present invention provide computer-implemented methods configured for retrieving or receiving health and communication data from one or more of the user device and IoT devices associated with the user. For example, health data may be accessed and/or collected as data streams from proximity contextual data-driven devices (e.g., personal assistance device, environmental sensor, mood sensor, heart-rate monitor, blood-pressure monitor, pulse oximeter, body activity accelerometer) configured to gather biometric data and/or environmental data. Further, communication data (e.g., emails, voice calls, text messages, social media activity) may be accessed, collected, stored, and/or processed (e.g., compared) to assist in determining a context of a communication between parties.

Aspects of the present invention provide computer-implemented methods configured for determining a user state or a user stress level during a decision making process based on the health data and the communication data. For example, embodiments described herein may be configured for detecting a decision by processing user activity data gathered by activity tracking device associated with the user, wherein the user activity data may correspond to recent user social media activity (e.g., posts, messages, likes, dislikes, comments, shares, scrolling tempo), meeting/appointment activity, and/or emotional/behavioural activity (detected by proximate IoT device sensors or personal smart assistance tools).

Aspects of the present invention provide computer-implemented methods configured for configuring conditions to trigger user data set collection from the available data sources in response to receiving user input corresponding to an opt-in or subscription to the service provided by and embodied within the scope of the present invention. For example, user devices may be configured to receive user input to perform service opt-in or service registration for the user devices and/or IoT devices. Once registered, the user devices and/or IoT devices may be configured to be mapped to the applications, systems, and other resources based on certain parameters including, but not limited to user profile data (e.g., address, phone number, favorite/usual contacts), trusted third-party information (e.g., contact information, direct or indirect notification preference, additional trustee verification), medical profile (e.g., allergies, medications, medical device data), financial contact (e.g., financial institutions, financial institution contact), communication systems (e.g., email, text, voice calls), and health monitoring systems (e.g., IoT device gathering biometric data, sensor data, device identifier, device data, device use).

Further, embodiments described herein may be configured for configuring conditions to trigger user health and user communication data set collection from the available data sources in response to detecting certain user stress levels (e.g., elevated, heightened, baseline) during a time when the user is determined to be making a critical decision. For example, a user device may be configured to detect that the active voice call is between the user and a new contact based on historical user call data, wherein the new contact detection may be configured to trigger a detection of certain keywords in the voice call data that may correlate to a call type (e.g., exploitative, non-exploitative).

Aspects of the present invention provide computer-implemented methods configured for establishing a baseline of scope include an application scope, an action scope, and a system scope with actions. For example, an application scope may include normal health data, health data correlated to a time or a day, health data correlated to each contact, features of the module activated for the user, conditions to establish base data metrics, and conditions to trigger base data to verify/correlate with historical data. Further, action scope may include instructions to directly contact a third-party (e.g., trustee), contact the third-party only if an action (e.g., user action, caller action) is in progress. For example, a user action being in progress may include the user entering user input data on a user device to log into a website for a financial institution or for the user to travel to a financial institution. Furthermore, action scope may further include instructions to directly contact the financial institution with authorization, instructions to the financial institution to perform a verification to evaluate the ongoing situation between the caller and the user, or instructions for the financial institution to contact the trustee to inquire about the ongoing situation.

Aspects of the present invention provide computer-implemented methods configured for calculating real-time input data to compare to baseline health data and attributes to determine if user stress levels have exceeded a threshold. For example, embodiments described herein may include a comparison module configured to perform real-time cross-referencing of user data with saved learned data.

Further, embodiments described herein may be configured for analysing user health status based on the user health data to determine a user stress or anxiety index/disposition. For example, historical user health data may be used to determine a baseline user health index/disposition under various circumstances and real-time user health data may be used to determine a real-time user health index/disposition, wherein a comparison between the baseline and real-time user health index/disposition to determine if a predetermined threshold has been exceeded. For example, the predetermined threshold may be exceeded if the real-time user heal index/disposition is greater than the baseline user health index/disposition by 5%, 10%, or any percentage specified to be sufficient for exceeding the threshold.

Aspects of the present invention provide computer-implemented methods configured to process training data (e.g., voice call data, user data, communication data) to train machine learning models to identify call types (e.g., solicitation, non-solicitation) and user stress levels (e.g., normal, baseline, elevated, heightened). Further, additional data may be gathered and added to the training data to continuously improve the learning algorithms and re-train the trained models to better estimate thresholds to determine when a user stress level has exceeded the threshold. Therefore, the predictive measure of the trained model may be configured to trigger an alert or notification to augment the user's critical decision-making process.

Aspects of the present invention provide computer-implemented methods configured for generating the alert comprising a recommendation and a summary of conditional analytics, which may be coupled with a presentation of key points for the user to consider prior to making a final decision during the active voice call. For example, system scope and actions may include a determination that a fraudulent or exploitative communication is detected based on the voice call data and the user health data, generating a notification or alert for a designated financial institution, instructions for the financial institution to place a hold on account transactions, instructions for the financial institution to examine and evaluate the ongoing situation or scenario, and instructions for the financial institution to contact the trustee, as various of many examples.

Furthermore, aspects of the present invention provide computer-implemented methods configured for notifying a third-party (e.g., trusted assigned individual/entity) with a summary of the ongoing solicitation call, wherein the third-party may be configured to provide an input of response data corresponding to instructions/actions to be performed to prevent the user from exploitation. For example, aspects of the present invention are configured to securely communicate with third-party entities (e.g., financial institutions, designated family members, law enforcement authorities) who may be authorized to take appropriate intervention measures when an exploitation target is flagged. Additionally, embodiments described herein may be configured to further communicate with the authorized third-party entities to monitor a user's account for a financial transaction anomaly and intervene to help verify the suspected financial exploitation based on user health data (e.g., user's biometric data) corresponding to stress and anxiety linked to the user's account. Once the security features of the present invention are implemented an application program or software service executing on a user device of the customer, exploitative calls can be identified, flagged, reported, and blocked from future attempts to the user or other users, resulting in enhanced overall security of customer financial information and resources, but also providing significant savings to financial institutions and other entities that end up taking responsibility for the loss.

As described herein, a data driven machine learning approach is provided to identify exploitative calls to users by compiling a labeled dataset of phrases (e.g., voice phrases, text phrases) and training multiple models on sentence embeddings and syntactic features. Natural language interaction is a difficult task for machines to master because natural language utterances can be highly unstructured, and their content can vary widely. However, various phrases may be classified as being associated with either an exploitative call (i.e., solicitation combined with elevated user stress) or a legitimate call and those classified phrases may be used to train a machine learning model to identify the types of calls as such.

Embodiments described herein may include a central server configured to save data (limited to non-identifying data) corresponding to all voice calls meeting certain criteria (e.g., solicitation for sales) and receive updates corresponding to new threat pattern definitions, wherein the one or more processors may be configured to perform cyclical updates to receive and download data corresponding to new threat patterns. In other words, non-personal call data may be saved and catalogued in a database to improve models for identifying call type features corresponding to exploitation attempts. For example, the central server may be implemented using Java technology and a No-SQL DB such as Mongo DB. Furthermore, the one or more processors may be configured to inculcate the above-described patterns and interject the knowledge base at inflection points.

Embodiments described herein may be configured to catalogue baseline values for user health levels under various circumstances. By cataloguing normal behaviors and health levels, and continuously updating the training and testing data, the models used to determine the status of the user stress during a solicitation call will be improved to be better able to identify anomalies. In an embodiment, the machine learning models may be based on various types of distributions where each one may be tested to determine which model would provide the best fit. For example, the models may include Gaussian distributions, exponential distributions, parabolic fractal distributions, or other forms of distributions. Therefore, upon identifying of an anomaly in the voice call data and the user data, embodiments described herein may be configured to autonomously begin identifying the type of anomaly and accompanying characteristics associated with the anomaly. For example, the caller and information about the caller may be identified and preventative action that was taken in a previously similar situation may be automatically dispatched to execute the preventative action.

Further, embodiments described herein may be configured to perform anomaly detection, wherein after the anomaly is detected, the one or more processors may be configured to execute pre-defined steps to address the anomaly based on gathered IoT data, consolidated data, historical data, and a probability correlation. For example, automatic detection may be performed based on previously stored data (e.g., historical data), wherein the one or more processors may be configured to execute preventative actions that have a threshold probability of preventing the user from being exploited during the active voice call while under duress. Furthermore, automatic scenario addition may be performed if the executed preventative actions are not effective in preventing the user from providing financial information while under duress, wherein the one or more processors may be configured to gather all data associated with the active voice call and correlate the gathered data with an ineffective preventative action so that a future similar scenario will be treated differently. For example, the one or more processors may be configured to perform a different preventative action that has a higher probability of preventing the user from providing the financial information, or alternatively, bypass the scenario as normal.

Further, embodiments described herein may be configured to perform health signs correlation, wherein the one or more processors may be configured to correlate the previous information pertaining to the user archived data to social collaboration. For example, existing communications health data may be considered as normal based on collected data (e.g., known contacts, connected device response, time of the day, medication time impact on user health data, medication time relation to communications).

Further, embodiments described herein may be configured to perform new contact correlation, wherein new contact attributes may be considered in determining whether the active voice call is exploitative or not. For example, new contact attributes may include whether the new contact matches historical contact information, the frequency of the approach, time, keywords, action required by the user, urgency of the action required, and voice and tone analytics. Furthermore, new contact correlation may include safe contact learning, wherein the one or more processors may be configured to identify the new contact as a normal contact, add the new contact to the database of known contacts, wherein relative health data associated with the new contact may also be stored with the new contact.

Further, embodiments described herein may be configured to perform system anomaly detection on a new contact identified as exploitative, wherein the one or more processors may be configured to perform data collection and aggregation on the detected exploitative new contact and update the database with the collected data to establish an improved baseline of scope, as described above herein. Furthermore, the one or more processors may be configured to perform a system update, and associate the anomaly with, the data corresponding to the detected exploitative new contact. Once the system is updated with the anomaly, the one or more processors may be configured to confirm that the relevant health data is recorded to correlate and trigger future encounters with the appropriate preventative and system update actions.

Embodiments described herein may be configured to process the voice call data (e.g., audio data, text data) using natural language model to detect the types of phrases, and incorrect phrasing, that are typical of exploitative calls. Furthermore, embodiments described herein may be configured to use machine learning techniques to augment and extend pattern definitions, thereby facilitating continuous learning about exploitative call signatures. Even further, embodiments described herein may be configured to use predictive analytics to augment and extend pattern definitions.

Focusing on natural language understanding, its goal is to comprehend a natural language utterance ranging from the syntactic composition and the roles of words in a sentence to its semantic meaning, context, and other tasks. Embodiments described herein focus on the task of identifying specific phrase content and sentence structures to determine which phrase is more likely to be associated with a spam or fraud caller and which phrases do not. Identifying the type of phrase in a sentence is useful for performing classifications in multiple scenarios. For example, identifying phrases in sentences that are exploitative (i.e., unauthorized solicitations) or fraudulent (i.e., soliciting confidential financial information for unauthorized use) provides an advantage for embodiments described herein to alert the user to the bad act attempt and empowers the user to take appropriate action. Further, embodiments described herein may be configured to automatically take remedial action to shield the user from the unwanted interaction.

Embodiments described herein provide computer-implemented methods configured to train a machine learning model to identify natural language utterances or phrases in a voice call greeting that is exploitative (e.g., "Please enter your social security number now" and "would you like to purchase insurance") vs. those that are not exploitative (e.g., "This is Flo from your insurance company, company identification no. 12345 and I would like to speak to Mr. Safe who is a current client."). Unlike performing intent recognition that also takes into account the domain of the request, this classification may be domain independent. For example, a dataset of natural language statements in a particular language (e.g., English) may be compiled from existing benchmarks in the literature and the dataset may be labeled based on the two classes (i.e., exploitative, non-exploitative). Further, machine learning models (e.g., shallow, deep learning) may be trained on various features including sentence embeddings and syntactic features. As a result, a specific natural language task and identification of its importance in messaging dialog systems are defined and contributed to the embodiments described herein. Further, embodiments described herein include labeled collections of sentences and/or phrases and a machine learning model that has learned the classification task.

Embodiments described herein may be applied to both voice data and text data, wherein an exploitative call may be identified based at least on determining whether a phrase uttered during the call matches a known exploitative phrase. Understanding when a phrase is exploitative or not helps determine whether the user should continue with the call, or an alert should be issued to the trusted third-party to perform exploitation preventative actions. Further, if the call is determined to be exploitative, then the user device may be configured to execute instructions to instruct the user to end the call, automatically end the call, and data about the call and the user may be compiled and saved to the database to improve future determinations or to add the call information added to a list of known exploitative callers.

In an embodiment, to learn a classification task, an appropriate dataset is created to train the machine learning model. The dataset primarily distinguishes between phrases associated with exploitative calls and phrases associated with non-exploitative calls. For example, the classification task may be configured to determine a risk score associated with an incoming call, wherein if the incoming call exceeds a risk threshold, the one or more processors may be configured to pause the incoming call, generate a notification to inform the user of the call risk, and automatically perform exploitation preventative actions.

Embodiments described herein may include one or more models to choose from for a specific application based on certain application parameters. For example, application parameters may include complexity/simplicity of the problem, computational constraints (e.g., space and time) on training/testing, and problem characteristics (e.g., feature independence/dependence, amount of data noise, stochasticity, stationarity), among others. Each model may have a set of hyper-parameters that may be tuned to optimize training (e.g., feature mapping function, number of hidden neurons).

Embodiments described herein may include various types of machine learning models and techniques for training the machine learning models are used in detecting and preventing exploitative calls. For example, supervised learning techniques may be used on shallow models (e.g., SVM, k-nearest neighbor (kNN), random forest, decision tree, naïve Bayes) to serve as a baseline for comparison with deep learning models. Further, embodiments described herein may include performing grid search to fine-tune the hyper-parameters for SVM models, kNN models, or multi-later perceptron (MLP) models.

Embodiments described herein may include deep learning models to emulate the bidirectional-Long Short-Term Memory (LSTM) model to provide state of the art results for Natural Language Processing (NLP) tasks. For example, in a conversational environment, both the front and back halves of a sentence may be analyzed to provide the context to help in determining the meaning or intent of a sentence. Thus, a bidirectional-LSTM may provide improved results in analyzing the sentence in both front and back portions as opposed to a uni-directional LSTM.

Embodiments described herein use an array of datasets from conversational natural language literature to train the machine learning models. For a ground truth, the data may be annotated in a semiautomatic fashion to create a 45% (i.e., label: exploitative)—55% (label: non-exploitative) data split. For example, semiautomatic annotation may include identifying labels of data points on the source of data, wherein an example sentence (e.g., "I am calling about the coverage for your insurance ending soon") from a dataset that strongly correlates to an exploitative call (if solicitation call coupled with elevated user stress levels) would be labeled as such. Other sentences resembling the example sentence would be similarly labeled if they share the same properties and structure. Alternatively, another example sentence (e.g., "this is your credit card company calling to verify a transaction on your account to prevent fraud") from the dataset that strongly correlates to a non-exploitative call would be labeled as such.

Embodiments described herein may include training the machine learning models using a combination of pretrained BERT sentence embeddings and call type tags as input features to the machine learning models. For example, the input sentence embeddings may include dimensions of 768, 400, 200, or 100, scaling by a factor of approximately 2. Further, the sentence embeddings may be visualized in a 2-dimensional space by applying t-Distributed Stochastic Neighbor Embedding (t-SNE) with a perplexity of 50 on the 768-dimension sentence vectors. Further, 10-fold cross validation may be performed on the sentence vectors to report the train/validation performance.

Embodiments described herein may also include capturing more natural language structure from the sentences by appending call type tags (e.g., machine, human, narrative, interrogatory) of the sentences to the feature set. By including the call type tags, the models realize an improved performance because the call type tags assist the model in learning the natural language sentence structures. Furthermore, aggregating all shadow model results and feature sets, the SVM-based classifier model results in the least bias and generalizes well on unseen data when trained on call type tag features and BERT sentence embeddings.

Embodiments described herein include methods to identify users within a particular home environment, wherein each user may provide information or be provided with information to create a user profile. Information used to create a user profile may include demographic data, biometric data, health data, past activity data, present activity data, user schedule data, or other types of data corresponding to the user and/or the associated user device. Once each user profile is established, a user health level may be assessed based on user profile data.

An embodiment may include IoT devices gathering past activity data over a period of time. Past activity data may be gathered by IoT devices, user devices, or other devices or sensors configured to detect and gather activity within the home environment.

Embodiments described herein may also be configured for receiving user input data corresponding to a user selection to share exploitative case data with a centralized secure system to train other systems and models in exchange for some consideration (e.g., registration incentives to the user). As such, the one or more processors may be configured to not record any personal information about the user and only record data corresponding to the incident.

Embodiments of the present invention recognize that a custom solution is desired for detecting and preventing exploitative calls in an efficient and convenient manner. Implementations of embodiments of the invention may take a variety of forms, and exemplary implementation details are discussed subsequently with reference to the Figures.

Figure 1:
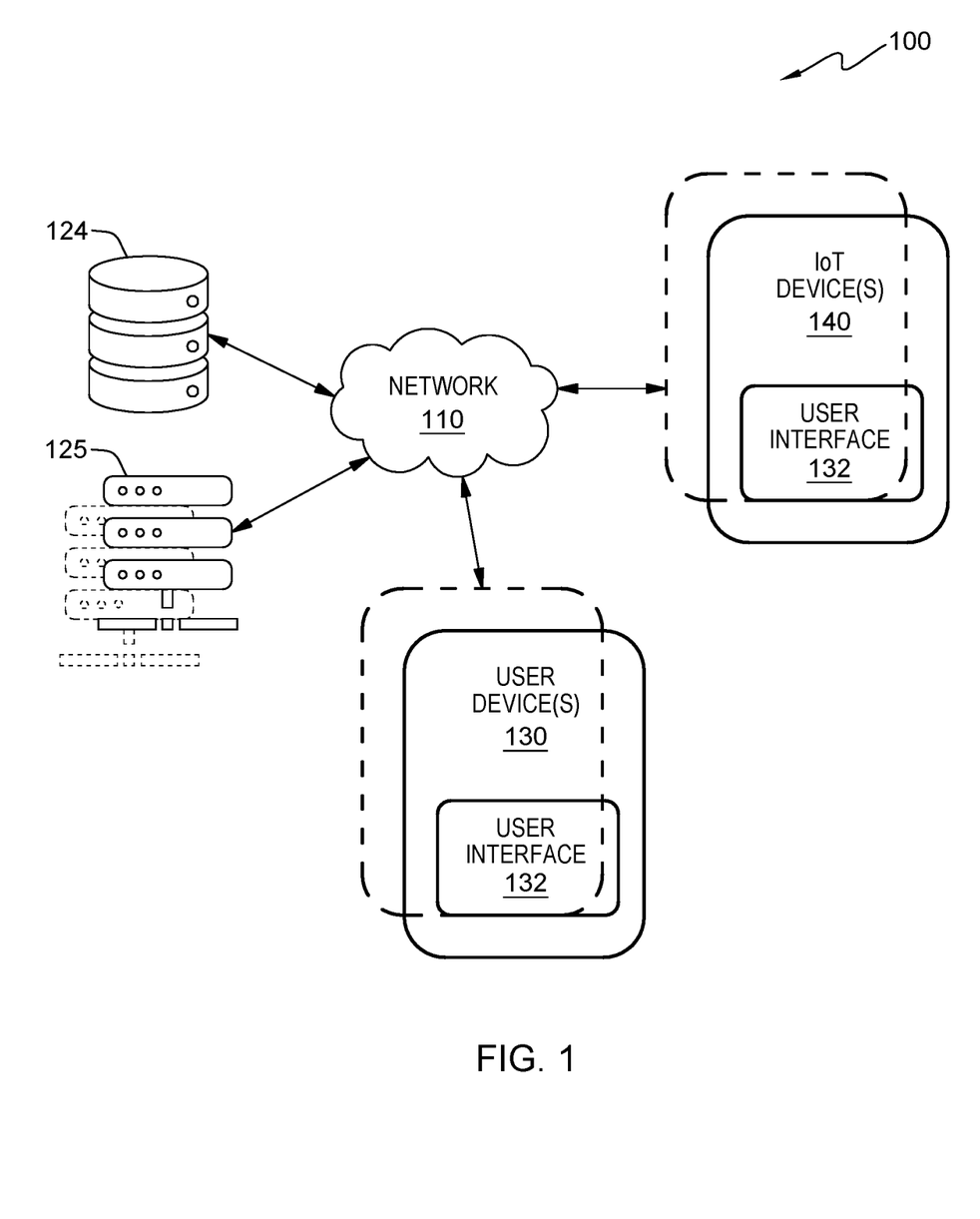
FIG. 1 depicts a block diagram of a distributed data processing environment for detecting and preventing exploitative calls, in accordance with an embodiment of the present invention.

FIG. 1 depicts a block diagram of a distributed data processing environment 100 for detecting and preventing exploitative calls, in accordance with an embodiment of the present invention.

FIG. 1 provides only an illustration of one embodiment of the present invention and does not imply any limitations with regard to the environments in which different embodiments may be implemented. As shown in FIG. 1, distributed data processing environment 100 for detecting and preventing exploitative calls includes network 110 configured to facilitate communication between database 124, server 125, user device(s) 130 and IoT device(s) 140. In an example embodiment, one or more processors may be configured for receiving user profile data, device profile data, and voice call data via network 110. Further, one or more processors may be configured for sending output data to user device(s) 130 via network 110.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between user device(s) 130 and IoT device(s) 140. It is further understood that in some embodiments network 110 is optional and the distributed data processing environment 100 for detecting and preventing exploitative calls can operate as a stand-alone system, where in other embodiments, network 110 may be configured to enable user device(s) 130 and/or IoT device(s) 140 to share a joint database using network 110.

User interface 132 operates as a local user interface on user device(s) 130 through which one or more users of user device(s) 130 interact with user device(s) 130. User interface 132 may also operate as a local user interface on IoT device(s) 140 through which one or more users of user device(s) 130 interact with IoT device(s) 140. In some embodiments, user interface 132 is a local app interface of a program (e.g., software configured to execute the steps of the invention described herein) on user device(s) 130 or IoT device(s) 140. In some embodiments, user interface 132 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 132 enables a user to send and receive data (i.e., to and from the program via network 110, respectively). In an embodiment, user interface 132 enables a user to opt-in to the program, input user related data, and receive alerts to complete a task or activity.

Database 124 may operate as a repository for data associated with server 125, user device(s) 130, IoT device(s) 140, and other data transmitted within network 110. A database is an organized collection of data. For example, user profile data may include data associated with user device(s) 130. Further, device profile data may include data associated with IoT device(s) 140. Database 124 can be implemented with any type of storage device capable of storing data and configuration files that can be accessed and utilized by either of user device(s) 130 or IoT device(s) 140, such as a database server, a hard disk drive, or a flash memory. In an embodiment, database 124 may be accessed by user device(s) 130 or IoT device(s) 140 to store data associated with user device(s) 130 or IoT device(s) 140. In another embodiment, database 124 may be accessed by user device(s) 130 or IoT device(s) 140 to access data as described herein. In an embodiment, database 124 may reside independent of network 110. In another embodiment, database 124 may reside elsewhere within distributed data processing environment 100 provided database 124 has access to network 110.

In the depicted embodiment, server(s) 125 may contain a program (e.g., software configured to execute the steps of the invention described herein) and database 124. In some embodiments, server(s) 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with user device(s) 130 and IoT device(s) 140 via network 110. In other embodiments, server(s) 125 represents a server computing system utilizing multiple computers as a server system, such as a cloud computing environment. In yet other embodiments, server(s) 125 represents a computing system utilizing clustered computers and components (e.g., database server computers, application server computers, etc.) that act as a single pool of seamless resources when accessed within distributed data processing environment 100. Server(s) 125 may include components as described in further detail in FIG. 5.

User device(s) 130 may be an electronic device configured for accompaniment with a user. User device(s) 130 may be a personal electronic device such as a mobile communications device, smart phone, tablet, personal digital assistant, smart wearable device, personal laptop computer, desktop computer, or any other electronic device configured for user interaction and gathering user information to generate a user profile. User device(s) 130 may include components as described in further detail in FIG. 5.

IoT device(s) 140 may be an electronic device configured to be a component within a smart home automation system including health monitoring systems, heating and air conditioning systems, media, and security systems. IoT device(s) 140 may include a wireless sensor, software, actuators, and computer devices. IoT device(s) 140 may be embedded in mobile devices, industrial equipment, environmental sensors, medical devices, and others. IoT device(s) 140 may be controlled from a remotely controlled system via network 110 or locally controlled system via a local network, or a combination of both. Further, IoT device(s) 140 may be configured to be controlled via a software application installed and executed by IoT device(s) 140. IoT device(s) 140, when connected to network 110, may convey usage data and other types of data corresponding to the device itself, or other devices connected via network 110, wherein the data may provide insights that are useful within the scope of the designed application. configured with a processor, memory, and peripherals (not shown) to receive and process data.

For user device(s) 130, a device profile includes, but is not limited to, a user device identifier (ID), a device type (e.g., a smart watch, a smart phone), data usage patterns for user device(s) 130, and data usage models for user device(s) 130. Data usage patterns may include data type, data use frequency, and user device data use history. A device profile may be created for each user device 130 in network 110. User device(s) 130 may consider data usage patterns and data usage models in a device profile when determining whether to execute a data usage request by user device(s) 130.

For IoT device(s) 140, a device profile includes, but is not limited to, an IoT device identifier (ID), an IoT device type (e.g., a heart monitor, body language sensor), data usage patterns for IoT device(s) 140, and data usage models for IoT device(s) 140. Data usage patterns may include data type, data use frequency, and IoT device data use history. A device profile may be created for each IoT device(s) 140 connected to network 110. IoT device(s) 140 may consider data usage patterns and data usage models in a device profile when determining whether to execute a data request by IoT device(s) 140.

User device(s) 130 and/or IoT device(s) 140 may operate as physical devices and/or everyday objects that are embedded with electronics, Internet connectivity, and other forms of hardware (e.g., sensors). In general, IoT device(s) 140 can communicate and interact with other IoT device(s) 140 over the Internet, or a local network while being remotely monitored and controlled. Types of IoT device(s) 140 include, but are not limited to, smart locks, garage doors, refrigerators, freezers, ovens, mobile devices, smart watches, air conditioning (A/C) units, washer/dryer units, smart TVs, virtual assistance devices, and any other smart home devices.

In an embodiment, a user may be permitted to opt-in and/or agree to a terms and service agreement upon setting up IoT device(s) 140 via network 110. The terms and service agreement may document the purpose of the information and data sharing between user device(s) 130 or IoT device(s) 140 and provide access to IoT devices on the network that have been designated for participation in network 110. The user agreement may include all mentioned passing devices that would allow control(s), trigger(s), or action(s) to be executed based on the user's original request. For networks with multiple users and multiple IoT devices, the system may extend the usage agreement to a defined or dynamic group, upon a new user joining said group.

While the foregoing describes implementation of a machine learning model, the present disclosure is not limited thereto. In at least some embodiments, a machine learning model may implement a trained component or trained model configured to perform the processes described above. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 2:
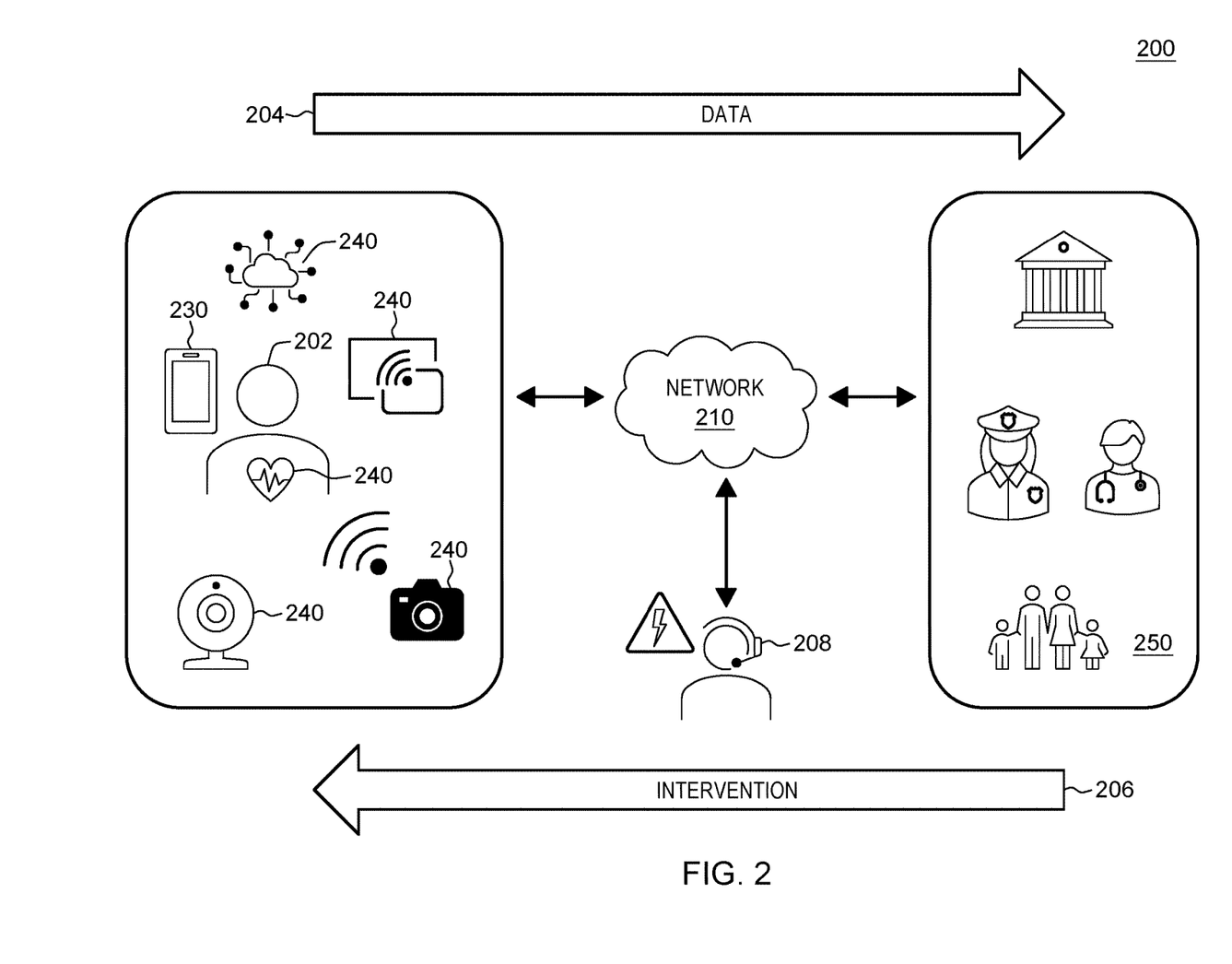
FIG. 2 depicts block diagram of a data flow process for detecting and preventing exploitative calls, in accordance with an embodiment of the present invention.

FIG. 2 depicts block diagram of data flow process 200 for detecting and preventing exploitative calls, in accordance with an embodiment of the present invention.

In an embodiment, data flow process 200 illustrates the flow of data 204 from user 202 within a smart-home environment (including one or more IoT device(s) 240) to a third-party 250 via network 210, wherein intervention 206 (e.g., preventative action) instructions may be communicated to user 202 to prevent caller 208 from exploiting user 202 during an active voice call.

In an embodiment, data flow process 200 may include one or more processors configured for facilitating intervention 206 data flow between user device 230 and third-party 250. For example, intervention 206 data may include voice call data comprising caller voice data and user voice data corresponding to an active voice call between user 202 and caller 208. Further, intervention 206 data may include IoT device data gathered from the one or more IoT device(s) 240 active within the smart-home environment.

In an embodiment, data flow process 200 may include one or more processors configured for determining that the caller voice data includes a solicitation of information from user 202 associated with user device 230. Further, data flow process 200 may include one or more processors configured for retrieving user profile data comprising user health data associated with user 202, wherein the user health data may include IoT device data representing historical health or real-time of user 202. Further, data flow process 200 may include one or more processors configured for determining user call stress levels based on the voice call data and the user profile data. Furthermore, responsive to determining that the user call stress levels exceed a predetermined threshold, and that the solicitation of information includes a material information (e.g., information that would likely affect a person's choice of goods or services or the person's decision to make a financial decision) request, data flow process 200 may include one or more processors configured for generating an alert to one or more of user device 230 and a third-party. For example, the alert may be generated at user device 230 and/or transmitted to third-party 250 in data 206 via network 210 to solicit a response from third-party 250, wherein the response may include a preventative action transmitted to user 202 as intervention 206.

Figure 3:
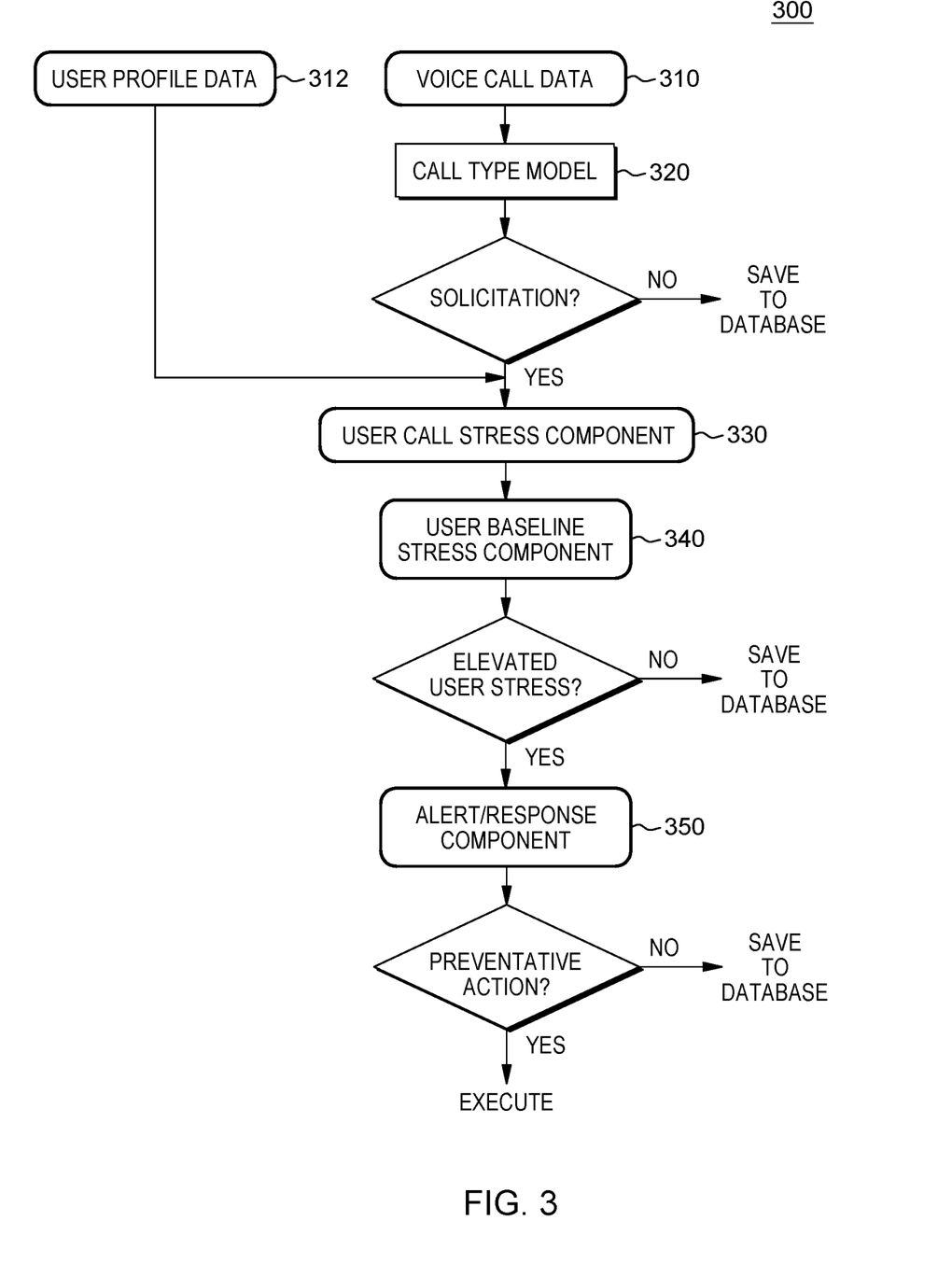
FIG. 3 depicts a workflow process for detecting and preventing exploitative calls, in accordance with an embodiment of the present invention.

FIG. 3 depicts a workflow process 300 for detecting and preventing exploitative calls, in accordance with an embodiment of the present invention.

In an embodiment, workflow process 300 may include one or more processors configured to receive voice call data 310 corresponding to an active voice call between a user and a caller and user profile data corresponding to the user.

In an embodiment, workflow process 300 may include call type model 320 configured to process voice call data 310 to determine whether the active voice call is a solicitation call or not a solicitation call. For example, call type model 320 may be configured to receive voice call data 310 comprising caller voice data and user voice data, wherein call type model may be configured to determine that the caller voice data includes a solicitation of information from a user associated with the user device. If the caller voice data is determined to not include a solicitation of information from a user of associated with the user device, then data generated and/or transmitted for workflow process 300 at this stage may be saved to a database as a record of a correlation between the call and features of the call.

In an embodiment, workflow process 300 may include user call stress component 330 configured to determine user call stress levels based on voice call data 310 and user profile data 312. For example, if the caller voice data is determined to include a solicitation of information from a user associated with the user device, then the one or more processors may be configured to transmit data generated and/or transmitted for workflow process 300 at this stage (e.g., voice call data 310 and an indication that the caller voice data includes a solicitation) and user profile data 312 to user call stress component 330 to determine user stress call levels.

In an embodiment, workflow process 300 may include user baseline stress component 340 configured to determine that the user call stress levels exceed a predetermined threshold. For example, the user health data may further include real-time health data, wherein the one or more processors may be configured to perform a first mapping of the voice call data to the real-time health data and generating a real-time user health distribution corresponding to the user call stress levels. Furthermore, user baseline stress component 340 may include one or more processors configured to perform a second mapping of historical user health data to context parameters, generating a baseline user health data distribution corresponding to a historical user health, and responsive to a comparison between the real-time user health distribution and the baseline user health distribution satisfying a second condition, determining that the user call stress levels exceed the predetermined threshold.

In an embodiment, workflow process 300 may include alert/response component 350 configured to receive an indication that the user call stress levels exceed the predetermined threshold. Further, alert/response component 350 configured to generate an alert to one or more of the user device and a third-party (e.g., via a third-party device associated with the third party) responsive to receiving the stress level exceeds indication.

In an embodiment, workflow process 300 may include one or more processors configured to determine if the alert includes a preventative action (e.g., intervention) to be executed and execute the preventative action in the affirmative.

In an embodiment, workflow process 300 may include one or more processors configured for storing (e.g., saving) each iteration of data transformation to a database as a correlation to the output determination to improve future output determination predictions.

Figure 4:
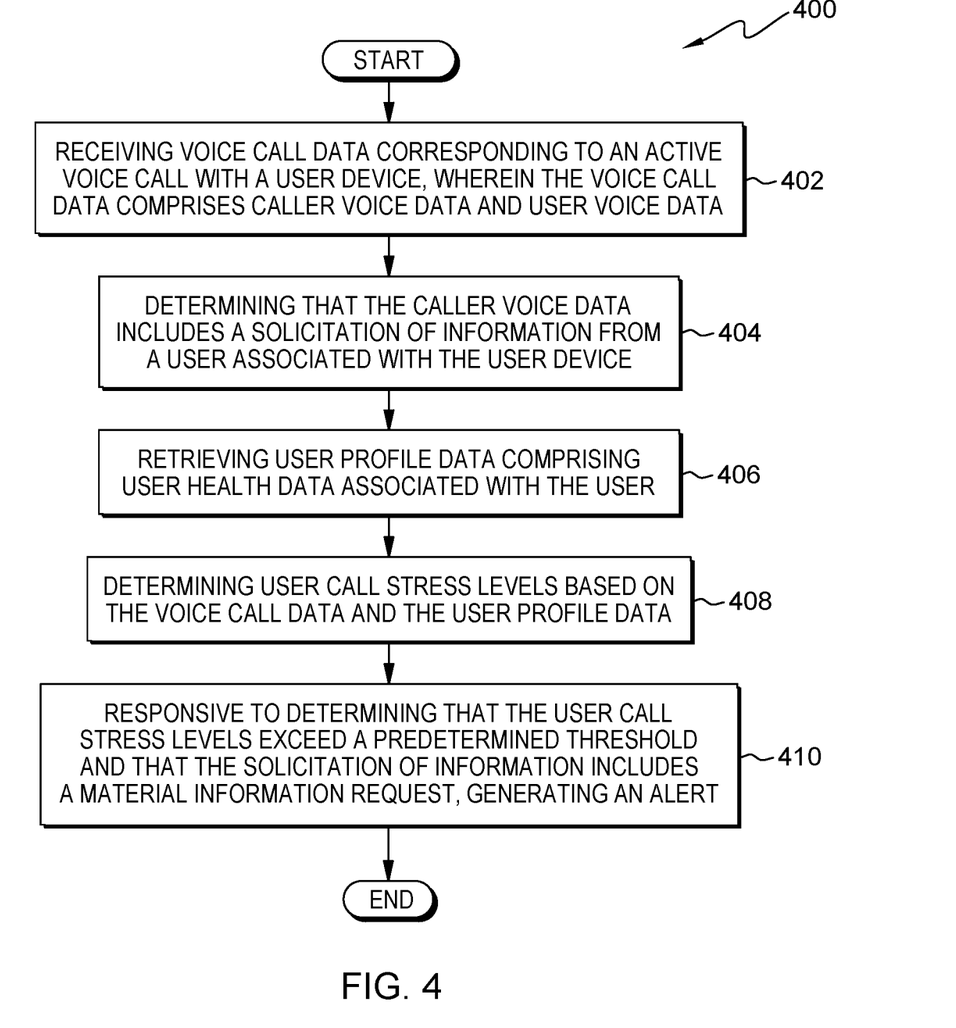
FIG. 4 depicts operational steps of a computer-implemented method for detecting and preventing exploitative calls, in accordance with an embodiment of the present invention.

FIG. 4 depicts operational steps of computer-implemented method 400 for detecting and preventing exploitative calls, in accordance with an embodiment of the present invention.

In an embodiment, computer-implemented method 400 may include one or more processors configured for receiving 402 voice call data corresponding to an active voice call with a user device, wherein the voice call data comprises caller voice data and user voice data.

In an embodiment, computer-implemented method 400 may include one or more processors configured for determining 404 that the caller voice data includes a solicitation of information from a user associated with the user device.

In an embodiment, determining 404 that the caller voice data includes a solicitation of information from a user associated with the user device may further include one or more processors configured for processing the caller voice data by a first trained model to generate first model output data corresponding to a call classification.

In an embodiment, determining 404 that the caller voice data includes a solicitation of information from a user associated with the user device may further include one or more processors configured for, responsive to determining that the call classification satisfies a first condition, identifying the caller voice data as including the solicitation of information.

In an embodiment, computer-implemented method 400 may include one or more processors configured for retrieving 406 user profile data comprising user health data associated with the user.

In an embodiment, computer-implemented method 400 may include one or more processors configured for determining 408 user call stress levels based on the voice call data and the user profile data.

In an embodiment, the user health data may include real-time health data and determining 408 user call stress levels may further include one or more processors configured for first mapping the voice call data to the real-time health data.

Further, computer-implemented method 400 for determining 408 user call stress levels may further include one or more processors configured for generating a real-time user health distribution corresponding to the user call stress levels based on the first mapping.

In an embodiment, computer-implemented method 400 for determining that the user call stress levels exceed a predetermined threshold may include one or more processors configured for second mapping historical user health data to context parameters selected from the group consisting of user identifier information, trustee information, medical information, financial information, communication information, and health monitoring information.

Further, computer-implemented method 400 for determining that the user call stress levels exceed a predetermined threshold may include one or more processors configured for generating a baseline user health distribution corresponding to a historical user health based on the second mapping.

In an embodiment, responsive to a comparison between the real-time user health distribution and the baseline user health distribution satisfying a second condition, computer-implemented method 400 may include one or more processors configured for determining that the user call stress levels exceed the predetermined threshold.

In an embodiment, responsive to determining that the user call stress levels exceed a predetermined threshold and that the solicitation of information includes a material information request computer-implemented method 400 may include one or more processors configured for generating 410 an alert to one or more of the user device and a third party device.

In an embodiment, computer-implemented method 400 may include one or more processors configured for receiving registration information from the user device and one or more Internet-of-Things (IoT) devices.

Further, computer-implemented method 400 may include one or more processors configured for processing the registration information to register the user device and one or more IoT devices.

Further, computer-implemented method 400 may include one or more processors configured for gathering the user health data from one or more of the user device and the one or more IoT devices.

In an embodiment, computer-implemented method 400 may include one or more processors configured for placing the active voice call on hold for a first time duration, receiving response data corresponding to a response to the alert during the first time duration, and responsive to determining that the response includes instructions to perform a preventative action, executing the preventative action.

In an embodiment, computer-implemented method 400 may include one or more processors configured for generating an anomaly record corresponding to a correlation between the voice call data and the user health data, associating the preventative action with the anomaly record, and responsive to identifying the correlation in a future active voice call, automatically executing the preventative action.

In an embodiment, workflow process 300 may include a trained model configured as a Natural Language Processing (NLP) engine to interpret voice call data 310 phrases embedded as 768 dim BERT phrase embeddings and active incoming call data received at user device 120. An NLP engine is a core component that interprets statements at any given time and converts the statements to structured inputs that the system can process. NLP engines may contain advanced machine learning algorithms to identify intent in caller statements and further matches caller intent to a list of available classifications determined and saved within the system. For example, NLP engines may use either finite state automatic models or deep learning models to generate system-generated responses to caller statements. NLP engine may include an intent classifier and an entity extractor, wherein the intent classifier may be configured to interpret the natural language of a statement and the entity extractor may be configured to extract key information or keywords from the statement.

In an embodiment, the machine learning model (e.g., trained model) may include a shallow model, as described above herein, wherein the shallow model is trained on various features (e.g., sentence embeddings, syntactic features) configured to generate model output data (e.g., call type classification) in response to receiving and processing NL text data. The model output data may include a binary classification indicating whether the NL text data corresponds to a solicitation call or does not correspond to a solicitation call.

Figure 5:
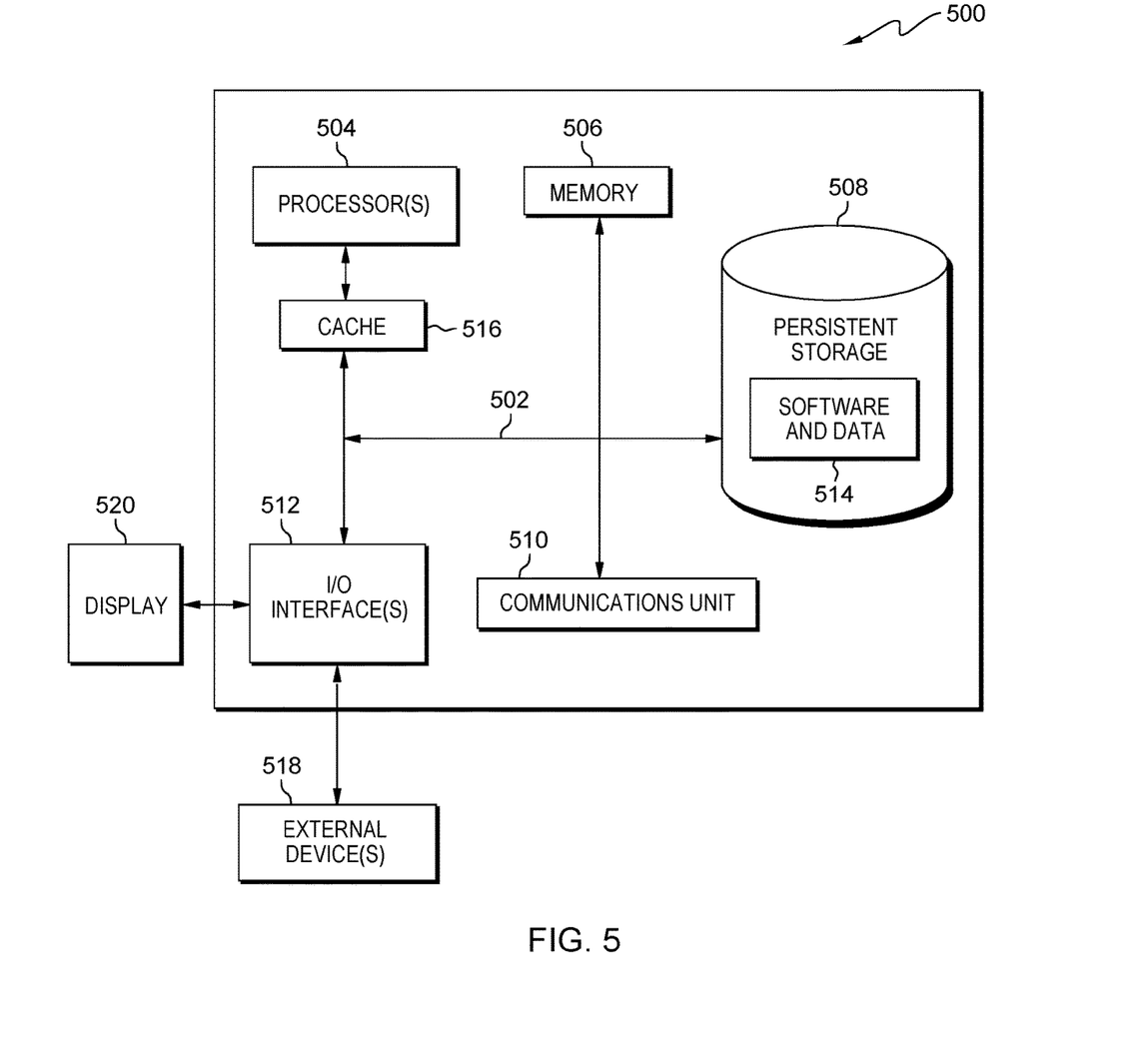
FIG. 5 depicts a block diagram of components of a server computer within the distributed data processing environment of FIG. 1, in accordance with an embodiment of the present invention.

FIG. 5 depicts a block diagram of components of the server computer (e.g., computing device 500, user device (s) 130, IoT device(s) 140) within the distributed data processing environment of FIG. 1, in accordance with an embodiment of the present invention.

Computing device 500 includes communications fabric 502, which provides communications between cache 516, memory 506, persistent storage 508, communications unit

510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to user device(s) 130. For example, I/O interface 512 may provide a connection to external devices 518 such as image sensor, a keyboard, a keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Software and data 514 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, voice call data corresponding to an active voice call with a user device, wherein the voice call data comprises caller voice data and user voice data;
   determining, by one or more processors, that the caller voice data includes a solicitation of information from a user associated with the user device;
   retrieving, by one or more processors, user profile data comprising real-time health data associated with the user;
   determining, by one or more processors, user call stress levels based on the voice call data and the user profile data, wherein determining the user call stress levels further comprises:
      first mapping, by one or more processors, the voice call data to the real-time health data; and
      generating, by one or more processors, a real-time user health distribution corresponding to the user call stress levels based on the first mapping;
   comparing the user call stress levels to a predetermined threshold, wherein the comparing comprises:
      second mapping, by one or more processors, historical user health data to context parameters;
      generating, by one or more processors, a baseline user health distribution corresponding to a historical user health based on the second mapping; and
      responsive to a comparison between the real-time user health distribution and the baseline user health distribution satisfying a second condition, determining, by one or more processors, that the user call stress levels exceed the predetermined threshold; and
   responsive to determining that the user call stress levels exceed a predetermined threshold and that a solicitation of information includes a material information request, generating, by one or more processors, an alert.

2. The computer-implemented method of claim 1, wherein determining that the caller voice data includes the solicitation of information further comprises:
   processing, by one or more processors, the caller voice data by a first trained model to generate first model output data corresponding to a call classification; and
   responsive to determining that the call classification satisfies a first condition, identifying, by one or more processors, the caller voice data as including the solicitation of information.

3. The computer-implemented method of claim 1, further comprising:
   receiving, by one or more processors, registration information from the user device and one or more Internet-of-Things (IoT) devices;
   processing, by one or more processors, the registration information to register the user device and the one or more IoT device; and gathering, by one or more processors, the user health data from one or more of the user device and the one or more IoT devices.

4. The computer-implemented method of claim 1, wherein the alert is generated to one or more of the user device and a third party device, further comprising:
placing, by one or more processors, the active voice call on hold for a first time duration;
receiving, by one or more processors, response data corresponding to a response to the alert during the first time duration; and
responsive to determining that the response includes instructions to perform a preventative action, executing, by one or more processors, the preventative action.

5. The computer-implemented method of claim 4, further comprising:
generating, by one or more processors, an anomaly record corresponding to a correlation between the voice call data and the user health data;
associating, by one or more processors, the preventative action with the anomaly record; and
responsive to identifying the correlation in a future active voice call, automatically executing, by one or more processors, the preventative action.

6. A computer program product, comprising:
one or more computer readable storage media and program instructions collectively stored on the one or more computer readable storage media, the stored program instructions comprising:
program instructions to receive voice call data corresponding to an active voice call with a user device, wherein the voice call data comprises caller voice data and user voice data;
program instructions to determine that the caller voice data includes a solicitation of information from a user associated with the user device;
program instructions to retrieve user profile data comprising real-time health data associated with the user;
program instructions to determine user call stress levels based on the voice call data and the user profile data, wherein the program instructions to determine the user call stress levels further comprise:
program instructions to first map the voice call data to the real-time health data; and
program instructions to generate a real-time user health distribution corresponding to the user call stress levels based on the first mapping
program instructions to compare the user call stress levels to a predetermined threshold, wherein the comparing comprises:
program instructions to second map historical user health data to context parameters;
program instructions to generate a baseline user health distribution corresponding to a historical user health based on the second mapping; and
responsive to a comparison between the real-time user health distribution and the baseline user health distribution satisfying a second condition, program instructions to determine that the user call stress levels exceed the predetermined threshold; and
responsive to program instructions to determine that the user call stress levels exceed a predetermined threshold and that the solicitation of information includes a material information request, program instructions to generate an alert to one or more of the user device and a third party device.

7. The computer program product of claim 6, wherein the program instructions to determine that the caller voice data includes the solicitation of information further comprises:
program instructions to process the caller voice data by a first trained model to generate first model output data corresponding to a call classification; and
responsive to the program instructions to determine that the call classification satisfies a first condition, program instructions to identify the caller voice data as including the solicitation of information.

8. The computer program product of claim 6, further comprising:
program instructions to receive registration information from the user device and one or more Internet-of-Things (IoT) devices;
program instructions to process the registration information to register the user device and the one or more IoT device; and
program instructions to gather the user health data from one or more of the user device and the one or more IoT devices.

9. The computer program product of claim 6, wherein the alert is generated to one or more of the user device and a third party device, further comprising:
program instructions to place the active voice call on hold for a first time duration;
program instructions to receive response data corresponding to a response to the alert during the first time duration; and
responsive to the program instructions to determine that the response includes instructions to perform a preventative action, program instructions to execute the preventative action.

10. The computer program product of claim 9, further comprising:
program instructions to generate an anomaly record corresponding to a correlation between the voice call data and the user health data;
program instructions associate the preventative action with the anomaly record; and
responsive to program instructions to identify the correlation in a future active voice call, program instructions to automatically execute the preventative action.

11. A computer system, comprising:
one or more computer processors;
one or more computer readable storage media;
program instructions collectively stored on the one or more computer readable storage media for execution by at least one of the one or more computer processors, the stored program instructions comprising:
program instructions to receive voice call data corresponding to an active voice call with a user device, wherein the voice call data comprises caller voice data and user voice data;
program instructions to determine that the caller voice data includes a solicitation of information from a user associated with the user device;
program instructions to retrieve user profile data comprising user health data associated with the user;
program instructions to determine user call stress levels based on the voice call data and the user profile data; and
responsive to program instructions to determine that the user call stress levels exceed a predetermined threshold and that the solicitation of information includes a material information request, program instructions to generate an alert to one or more of the user device and a third party device, wherein the alert is generated to the one or more of the user device and the third party device, further comprises:
program instructions to place the active voice call on hold for a first time duration;
program instructions to receive response data corresponding to a response to the alert during the first time duration;
responsive to the program instructions to determine that the response includes instructions to perform a preventative action, program instructions to execute the preventative action;
program instructions to generate an anomaly record corresponding to a correlation between the voice call data and the user health data;
program instructions to associate the preventative action with the anomaly record; and
responsive to program instructions to identify the correlation in a future active voice call, program instructions to automatically execute the preventative action.

12. The computer system of claim 11, wherein the program instructions to determine that the caller voice data includes the solicitation of information further comprises:
program instructions to process the caller voice data by a first trained model to generate first model output data corresponding to a call classification; and
responsive to the program instructions to determine that the call classification satisfies a first condition, program instructions to identify the caller voice data as including the solicitation of information.

13. The computer system of claim 11, wherein the user health data comprises real-time health data and the program instructions to determine the user call stress levels further comprises:
program instructions to first map the voice call data to the real-time health data; and program instructions to generate a real-time user health distribution corresponding to the user call stress levels based on the first mapping.

14. The computer system of claim 13, wherein the program instructions to determine that the user call stress levels exceed the predetermined threshold further comprises:
program instructions to second map historical user health data to context parameters selected from the group consisting of user identifier information, trustee information, medical information, financial information, communication information, and health monitoring information;
program instructions to generate a baseline user health distribution corresponding to a historical user health based on the second map; and
responsive to a comparison between the real-time user health distribution and the baseline user health distribution satisfying a second condition, program instructions to determine that the user call stress levels exceed the predetermined threshold.

15. The computer system of claim 11, further comprising:
program instructions to receive registration information from the user device and one or more Internet-of-Things (IoT) devices;
program instructions to process the registration information to register the user device and the one or more IoT device; and
program instructions to gather the user health data from one or more of the user device and the one or more IoT devices.

* * * * *